UNITED STATES PATENT OFFICE.

HERMAN SCHNEIDER, OF CINCINNATI, OHIO.

PROCESS FOR RAPID HARDENING OF CEMENT.

No. 828,976. Specification of Letters Patent. Patented Aug. 21, 1906.

Application filed April 27, 1906. Serial No. 314,050.

*To all whom it may concern:*

Be it known that I, HERMAN SCHNEIDER, a citizen of the United States, residing in Cincinnati, county of Hamilton, and State of Ohio, have invented a certain new and useful Process for the Rapid Hardening of Cement, of which the following is a full, clear, and exact description.

My process relates to the novel treatment of cements, both natural and artificial—such as are employed for building purposes, paving, and the like—and whether employed as neat cement or mixed to form concrete material or cement-mortar; and the purpose of my invention is to hasten to a very marked degree the hardening and setting of the cement material both initially and permanently and at the same time so to heat the material that it may be treated and used in cold and frosty weather without detriment.

My invention, broadly considered, consists in subjecting the cement material, whether concrete, cement-mortar, or neat cement, after it has been mixed with water to the action of a current of electricity of the requisite strength to suit the requirements.

As is well known, the setting of hydraulic cements is a comparatively slow process, the length of time to obtain the initial and the permanent set of the material depending on the qualities of the cement and the proportions and character of the mixture. Many varieties of natural and Portland cement are manufactured, and various mixtures of sand for cement-mortar and of sand and gravel, cinders, or broken stone for concrete are employed, and these materials and mixtures are used when mixed with either an excess or only a minimum quantity of water for a great variety of building and paving purposes.

For whatever purpose the cement material is intended to be used, whether to be molded into blocks or employed for concrete columns or flooring or for the uniting together of stone and brick work, I have discovered that if the material as soon as it has been mixed with water is subjected to a current of electricity the passage of the current has a very marked effect on the set of the material.

In carrying out my process I aim to pass the current through the body of the material and continue the application until or after the material has its permanent set. Where blocks of the cement material are formed in a mold, I provide metal plates for opposite faces of the block and connect the positive and negative wire terminals from any suitable supply, such as any convenient incandescent-light circuit, to the two metal plates. Certain ingredients of the wet material form a ready conductor for the current, and as the material hardens in the most direct path of the current, and thus ceases to serve as a ready conductor, the current takes the more indirect paths through the material more open to it until the entire mass becomes permanently set and loses in a measure its conductivity. Moreover, as the resistance increases as the material hardens heat is generated, which raises the temperature of the mass.

In the construction of concrete flooring it is the usual practice to embed in the top and bottom surfaces of the material metal rods to enhance the tensile and compression strength of the structure. In such cases I connect the current-wires, one to the upper and the other to the bottom metal bond, and continue the application until the mass has set permanently and as long thereafter as may be desired. For beams and columns of concrete, in which it is also customary to embed strengthening metal rods, I use one rod or set of rods for my positive terminal and another rod or set of rods for the negative terminal, so that the current shall pass as completely as may be through the entire mass.

Without attempting to point out in detail the exact application for the great variety of purposes for which cement material is employed, whether neat cement, concrete, or cement-mortar, it will be obvious from the foregoing description how the electric current is to be applied. At or near one surface I form a positive terminal, and at or near the opposite surface I form a negative terminal, and the current passes until automatically a substantially uniform hardening of the mass results.

The increased resistance of the constantly-hardening cement raises the temperature and facilitates the setting in cold and frosty weather, so that with my process there is no danger of the mass freezing or that frost will destroy the permanency of the structure before or after the permanent set of the material. The length of time required for the setting depends somewhat on the character and qualities of the particular cement and the proportion of the mixture and also, naturally, on the thickness or volume of the material under treatment. The strength of the electric current should be gaged in accordance with the mass to be treated. Quite a wide range of current may be employed. A current of low intensity will act more slowly in setting the material; but with longer application good results can be obtained, while the current should not be strong enough to raise the temperature to the boiling-point of water, as will be obvious.

Whatever description of cement material may be used the effect of the electric current is very marked. A small sample-block of material, which under natural conditions will take a day or more to receive its permanent set, will, when treated with electricity, as above described, receive its permanent set in fifteen or twenty minutes.

Concrete flooring, which takes several days to set permanently, when treated with the current sets permanently in a few hours. Not only is the setting of the material greatly enhanced and the temperature raised, so that there is no danger from frost, but there is no decrease of its tensile and compressive strength.

I do not wish to confine myself to any theory in explanation of the effect of the current in hastening the setting of the cement material; but, Having fully described my novel process, what I claim as new, and desire to secure by Letters Patent, is—

1. The process for the rapid hardening of cement, which consists in subjecting the cement material, when mixed for use, to a current of electricity, substantially as described.

2. The process for the rapid hardening of cement, which consists in passing a current of electricity through the cement material, when mixed with water, and continuing the current until or after the mass receives its permanent set.

3. The process for the rapid hardening of cement, which consists in passing through the cement material, when mixed with water, a current of electricity of a strength sufficient to heat the mass to prevent freezing.

4. The process for the rapid hardening of cement, which consists in embedding in the opposing surfaces of the mass of cement material when ready for use, the positive and negative terminals from a source of electricity, and in passing the current therethrough until or after the mass has obtained its permanent set.

5. The process for the rapid hardening of cement, which consists in embedding in the opposing surfaces of the mass of cement material when ready for use, the positive and negative terminals from a source of electricity and in passing the current therethrough until or after the mass has obtained its permanent set, said current being of sufficient strength to heat the mass to prevent freezing.

HERMAN SCHNEIDER.

Witnesses:
GLENA PRITCHARD,
EDW. C. MATLOCK.